(12) United States Patent
Lee et al.

(10) Patent No.: US 10,432,926 B2
(45) Date of Patent: Oct. 1, 2019

(54) METHOD FOR TRANSMITTING CONTENTS AND ELECTRONIC DEVICE THEREOF

(71) Applicant: Samsung Electronics Co., Ltd., Suwon-si, Gyeonggi-do (KR)

(72) Inventors: Woo-Yong Lee, Hwaseong-si (KR);
Jun-Young Park, Suwon-si (KR);
Seung-Hyup Baik, Hwaseong-si (KR);
Yun-Son Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 274 days.

(21) Appl. No.: 14/324,735

(22) Filed: Jul. 7, 2014

(65) Prior Publication Data
US 2015/0062352 A1 Mar. 5, 2015

(30) Foreign Application Priority Data
Sep. 3, 2013 (KR) ........................ 10-2013-0105768

(51) Int. Cl.
*H04N 17/00* (2006.01)
*H04W 52/02* (2009.01)

(52) U.S. Cl.
CPC ...... *H04N 17/002* (2013.01); *H04W 52/0254* (2013.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/26* (2018.01)

(58) Field of Classification Search
CPC .. H04N 17/002; H04W 52/0254; Y02B 60/50

USPC ......................................................... 709/229
See application file for complete search history.

(56) References Cited

U.S. PATENT DOCUMENTS

| | | | |
|---|---|---|---|
| 6,169,884 B1* | 1/2001 | Funk ...................... | H04B 1/036 455/522 |
| 8,583,044 B2* | 11/2013 | Dua .................. | G06F 17/30058 340/10.51 |
| 8,818,277 B2* | 8/2014 | Chen ................... | H04L 12/1827 455/41.2 |
| 2003/0163287 A1 | 8/2003 | Vock et al. | |
| 2004/0160901 A1 | 8/2004 | Raith | |
| 2006/0017833 A1* | 1/2006 | Gong ..................... | G03B 17/04 348/335 |

(Continued)

FOREIGN PATENT DOCUMENTS

| CN | 101491066 A | 7/2009 |
|---|---|---|
| CN | 102056096 A | 5/2011 |

(Continued)

OTHER PUBLICATIONS

Korean Office Action dated Aug. 6, 2019, issued in Korean Patent Application No. 10-2013-0105768.

*Primary Examiner* — Nicholas R Taylor
*Assistant Examiner* — Chong G Kim
(74) *Attorney, Agent, or Firm* — Jefferson IP Law, LLP

(57) ABSTRACT

A method of operating an electronic device is provided. The method includes receiving, by an electronic device, an input relating to data to be transmitted, monitoring a state of the electronic device, determining whether to transmit the data on a basis of at least part of a result of the monitoring, and transmitting the data according to a result of the determining.

20 Claims, 16 Drawing Sheets

(56) References Cited

U.S. PATENT DOCUMENTS

| | | | |
|---|---|---|---|
| 2006/0274155 A1* | 12/2006 | Kim | H04M 1/0241 348/208.3 |
| 2007/0200917 A1* | 8/2007 | Chen | H04M 1/72522 348/14.01 |
| 2008/0004067 A1* | 1/2008 | Piipponen | H04B 1/036 455/550.1 |
| 2008/0039212 A1 | 2/2008 | Ahlgren et al. | |
| 2008/0291937 A1* | 11/2008 | Cheshire | H04L 47/10 370/429 |
| 2008/0300027 A1* | 12/2008 | Dou | H03G 3/3042 455/574 |
| 2009/0006878 A1* | 1/2009 | Borghetti | G06F 1/3203 713/340 |
| 2009/0276547 A1* | 11/2009 | Rosenblatt | G06F 17/30058 710/33 |
| 2010/0125587 A1* | 5/2010 | Matsui | G06Q 10/107 707/752 |
| 2010/0235667 A1 | 9/2010 | Mucignat et al. | |
| 2010/0257251 A1* | 10/2010 | Mooring | H04W 4/206 709/216 |
| 2010/0330950 A1* | 12/2010 | Wells | H04B 1/3883 455/404.1 |
| 2011/0249078 A1* | 10/2011 | Abuan | H04N 7/147 348/14.02 |
| 2011/0320612 A1* | 12/2011 | Oka | H04W 4/008 709/227 |
| 2012/0092509 A1* | 4/2012 | Kim | G06F 3/04817 348/207.1 |
| 2012/0331394 A1* | 12/2012 | Trombley-Shapiro | H04L 67/06 715/748 |
| 2013/0179403 A1 | 7/2013 | Kim et al. | |
| 2013/0249521 A1* | 9/2013 | Cheng | G06F 1/28 323/304 |
| 2014/0059246 A1* | 2/2014 | Shin | H04L 29/06448 709/231 |
| 2014/0128021 A1* | 5/2014 | Walker | H04W 52/0212 455/405 |
| 2014/0187148 A1* | 7/2014 | Taite | H04M 1/7253 455/41.1 |
| 2014/0189061 A1* | 7/2014 | Stockwell | H04L 29/08117 709/218 |
| 2014/0199952 A1* | 7/2014 | Sandhu | H03F 1/303 455/91 |
| 2014/0200053 A1* | 7/2014 | Balasubramanian | H04W 52/22 455/572 |
| 2014/0256250 A1* | 9/2014 | Cueto | H04B 5/0031 455/41.1 |
| 2014/0289367 A1* | 9/2014 | Kinebuchi | H04L 67/02 709/219 |
| 2014/0310348 A1* | 10/2014 | Keskitalo | H04L 65/4084 709/204 |
| 2014/0359272 A1* | 12/2014 | Hiltunen | G09C 1/00 713/150 |
| 2015/0004912 A1* | 1/2015 | Diamond | H04W 4/008 455/41.2 |
| 2015/0004956 A1* | 1/2015 | Aksamit | H04W 4/025 455/418 |
| 2015/0049657 A1* | 2/2015 | Cheng | H04W 52/028 370/311 |
| 2015/0133076 A1* | 5/2015 | Brough | H04W 24/10 455/405 |
| 2015/0347262 A1* | 12/2015 | Vyas | G06F 11/3409 718/104 |
| 2016/0007141 A1* | 1/2016 | Anantharangachar | H04W 4/023 709/219 |
| 2016/0028832 A1* | 1/2016 | Switkin | H04L 67/141 709/205 |
| 2017/0208241 A1* | 7/2017 | Choi | G06F 3/0486 |

FOREIGN PATENT DOCUMENTS

| | | |
|---|---|---|
| CN | 102713788 A | 10/2012 |
| CN | 103197991 A | 7/2013 |
| JP | 2011-139494 A | 7/2011 |
| JP | 2013-098643 A | 5/2013 |
| KR | 10-2004-0034664 A | 4/2004 |
| KR | 10-2009-0003738 A | 1/2009 |
| WO | 2013/120723 A1 | 8/2013 |

* cited by examiner

METHOD FOR TRANSMITTING CONTENTS AND ELECTRONIC DEVICE THEREOF

CROSS-REFERENCE TO RELATED APPLICATION(S)

This application claims the benefit under 35 U.S.C. § 119(a) of a Korean patent application filed on Sep. 3, 2013 in the Korean Intellectual Property Office and assigned Serial number 10-2013-0105768, the entire disclosure of which is hereby incorporated by reference.

TECHNICAL FIELD

The present disclosure relates to a method for transmitting contents and an electronic device thereof.

BACKGROUND

As wearable electronic devices linkable to other electronic devices continue to develop, this satisfies the diverse needs of users. For example, while wearing a wearable electronic device on a user's wrist or shoulder, a user may capture an image or a video and transmit it to an electronic device linked to the wearable electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a device and method for improving power economy by transmitting contents to an electronic device under conditions that satisfy settings for reducing current consumption when contents stored in a wearable electronic device are transmitted to the electronic device.

Another aspect of the present disclosure is to provide a device and method for satisfying a user's various needs by reflecting a set priority and transmitting contents when transmitting the contents from a wearable electronic device to an electronic device.

In accordance with an aspect of the present disclosure, a data transmission method of an electronic device is provided. The method includes receiving an input relating to data to be transmitted, monitoring a state of the electronic device, determining whether to transmit the data according to a result of the monitoring, and transmitting the data according to a result of the determining.

In accordance with another aspect of the present disclosure, an electronic device is provided. The electronic device includes a mounting part mounted on an external device, at least one communication unit, and a processor operatively coupled to the at least one communication unit. The processor is configured to perform operations including receiving an input relating to data to be transmitted through the communication unit, monitoring a state of the electronic device, determining whether to transmit the data through the communication unit on a basis of at least part of a result of the monitoring, and transmitting the data according to a result of the determining.

In accordance with another aspect of the present disclosure, a non-transitory computer readable recording medium is provided. The recording medium has a program recorded thereon, which, when executed by an electronic device, implements a method. The method includes receiving an input relating to data to be transmitted through a communication unit, monitoring a state of the electronic device, determining whether to transmit the data through the communication unit on a basis of at least part of a result of the monitoring, and transmitting the data according to a result of the determining.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
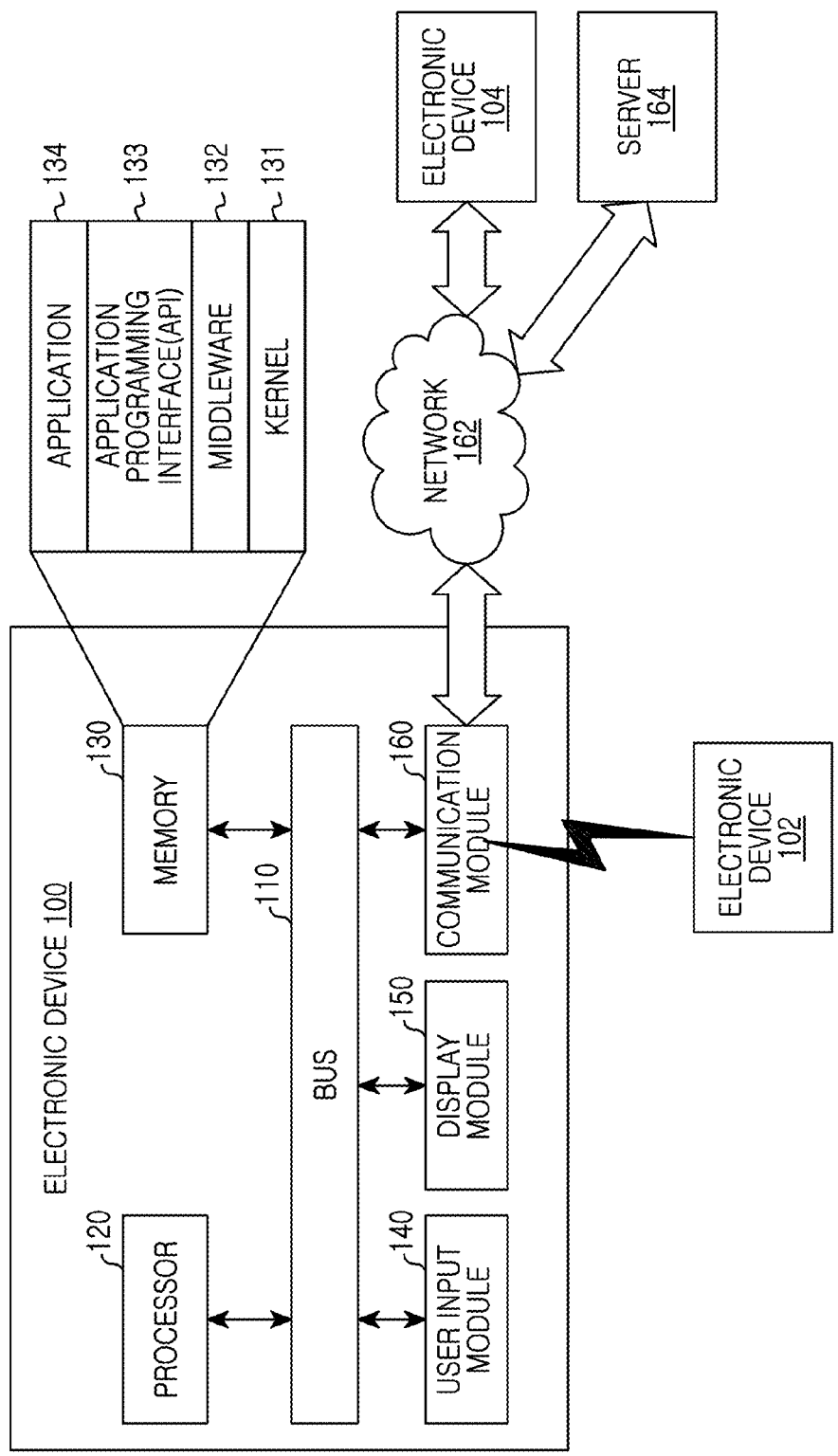
FIG. 1 is a block diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to an embodiment of the present disclosure may be a device having a communication function. For example, the electronic device may be at least one or a combination of a smart phone, a tablet Personal Computer (PC), a mobile phone, a video phone, an e-book reader, a desktop PC, a laptop PC, a netbook computer, Personal Digital Assistant (PDA), a Portable Multimedia Player (PMP), a Motion Picture Experts Group (MPEG)-2 Audio Layer III (MP3) player, a mobile medical device, an electronic bracelet, an electronic necklace, an electronic accessory, a camera, a wearable device, an electronic clock, a wrist watch, smart household appliance (for example, a refrigerator, an air conditioner, a vacuum cleaner, an artificial intelligence robot, a television (TV), a Digital Versatile Disk (DVD) player, an audio system, an oven, a microwave, a washing machine, an air purifier, and a digital photo frame), various medical devices (for example, Magnetic Resonance Angiography (MRA), Magnetic Resonance Imaging (MRI), Computed Tomography (CT), tomography, and ultrasonograph), a navigation device, a Global Positioning System (GPS) receiver, an Event Data Recorder (EDR), a Flight Data Recorder (FDR), a set-top box, a TV box (for example, Samsung HomeSync™, Apple TV™, or a Google TV™), an electronic dictionary, a vehicle infotainment device, electronic equipment for a ship (for example, a navigation device for a ship and a gyro compass), avionics, a security device, an electronic garment, an electronic key, a camcorder, a game console, a Head-Mounted Display (HMD), a flat panel display device, an electronic album, part of a furniture or building/structure including a communication function, an electronic board, an electronic signature receiving device, and a projector. It is apparent to those skilled in the art that the electronic device is not limited to the above-mentioned devices.

FIG. 1 is a block diagram illustrating an electronic device according to an embodiment of the present disclosure.

Referring to FIG. 1, the electronic device 100 may include a bus 110, a processor 120, a memory 130, a user input module 140, a display module 150, and a communication module 160.

In this specification, the term "communication module" may mean a module, a component, or a unit for performing a wired and/or wireless communication by using at least one communication protocol. According to an embodiment of the present disclosure, one communication module may include a plurality of communication components or communication units using different protocols. According to another embodiment of the present disclosure, an electronic device may include a plurality of communication modules and each communication module may include at least one communication component or unit using the same or different protocols. According to another embodiment of the present disclosure, the terms "communication module", "communication component", and "communication unit" may be mixed and used interchangeably.

The bus may be a circuit connecting the above-mentioned components to each other and delivering a communication (for example, a control message) therebetween.

The processor 120 receives an instruction from the above other components (for example, the memory 130, the user input module 140, the display module 150, and the communication module 160) through the bus 110, interprets the received instruction, and performs operations and data processing in response to the interpreted instruction.

The memory 130 may store an instruction or data received from the processor 120 or other components (for example, the user input module 140, the display module 150, and the communication module 160) or an instruction or data generated from the processor 120 or other components. The memory 130 may include programming modules, for example, a kernel 131, a middleware 132, an Application Programming Interface (API) 133, and an application 134. Each of the above-mentioned programming modules may be configured with software, firmware, hardware, or a combination thereof.

The kernel 131 may control or manage system resources (for example, the bus 110, the processor 120, or the memory 130) used for performing operation or functions implemented by the remaining other programming modules, for example, the middleware 132, the API 133, or the application 134. Additionally, the kernel 131 may provide an interface for accessing an individual component of the electronic device 100 from the middleware 132, the API 133, or the application 134 and controlling or managing it.

The middleware 132 may serve as an intermediary role for exchanging data between the API 133 or the application 134 and the kernel 131 through communication. Additionally, in relation to job requests received from a plurality of applications 134, the middleware 132 may perform a load balancing on the job requests by using a method of assigning a priority for using a system resource (for example, the bus 110, the processor 120, or the memory 130) to at least one application among the plurality of applications 134.

The API 133, as an interface through which the application 134 controls a function provided from the kernel 131 or the middleware 132, may include at least one interface or function for file control, window control, image processing, or character control.

The user input module 140 may receive an instruction or data from a user and deliver it to the processor 120 or the memory 130 through the bus 110. The display module 150 may display an image, video, or data to a user.

The communication module 160 may connect a communication between another electronic device 102 and the electronic device 100. The communication module 160 may support a predetermined short range communication protocol (for example, Wifi, BLUETOOTH (BT), Near Field Communication (NFC)) or a predetermined network communication 162 (for example, Internet, Local Area Network (LAN), Wire Area Network (WAN), telecommunication network, cellular network, satellite network, or Plain Old Telephone Service (POTS)) to communicate with another electronic device 104 or a server 164. Each of the electronic devices 102 and 104 may be identical to (for example, the same type) or different from (for example, a different type) the electronic device 100.

Figure 2:
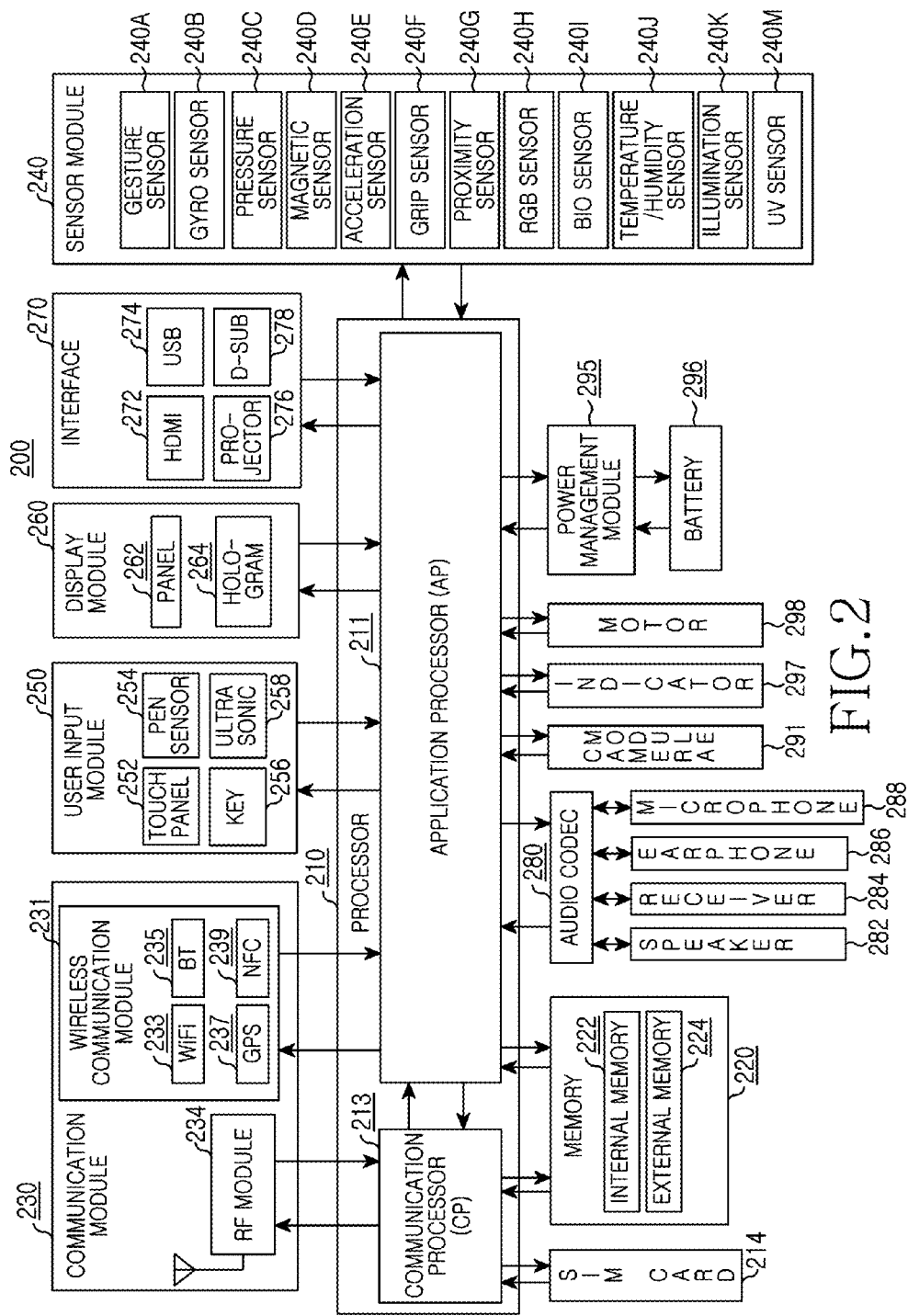
FIG. 2 is a block diagram of hardware according to an embodiment of the present disclosure.

FIG. 2 is a block diagram of hardware according to an embodiment of the present disclosure. The hardware 200 may be the electronic device 100 shown in FIG. 1, for example.

Referring to FIG. 2, the hardware 200 includes at least one processor 210, a Subscriber Identification Module (SIM) card 214, a memory 220, a communication module 230, a sensor module 240, a user input module 250, a display module 260, an interface 270, an audio Coder-DECoder (CODEC) 280, a camera module 291, a power management module 295, a battery 296, an indicator 297, and a motor 298.

The processor 210 (for example, the processor 120) may include at least one Application Processor (AP) 211 or at least one Communication Processor (CP) 213. The processor 210 may be the processor 120 shown in FIG. 1, for example. Although the AP 211 and the CP 213 included in the processor 210 are shown in FIG. 2, they may be included in different Integrated Circuit (IC) packages. According to an embodiment of the present disclosure, the AP 211 and the CP 213 may be included in one IC package. The processor 210 determines whether at least one selected content satisfies a set condition to be transmitted to a first electronic device. Additionally, the processor 210 may measure the distance with the first electronic device and may determine whether the distance with the first electronic device is less than a set distance. Additionally, the processor 210 may measure a current internal temperature and may compare the measured internal temperature with a set heat temperature. Additionally, the processor 210 determines whether a priority of at least one content to be transmitted to the first electronic device is set. Moreover, the processor 210 may determine whether there is at least one content not transmitted to the first electronic device among at least one content and if there is at least one content not transmitted to the first electronic device, and may determine whether a battery is being changed among set conditions. Additionally, the processor 210 may determine whether an input for capturing is not received within a set time while a capturing module is in operation and if it is determined that the input for capturing is not received, may terminate the capturing module in operation.

The AP 211 may control a plurality of hardware or software components connected to the AP 211 by executing an operating system or an application program and may perform various data processing and operations with multimedia data. The AP 211 may be implemented with a System on Chip (SoC), for example. According to an embodiment of the present disclosure, the processor 210 may further include a Graphic Processing Unit (GPU) (not shown).

The CP 213 may manage a data link in a communication between an electronic device (for example, the electronic device 100) including the hardware 200 and other electronic devices connected via a network and may convert a communication protocol. The CP 213 may be implemented with a SoC, for example. According to an embodiment of the present disclosure, the CP 213 may perform at least part of a multimedia control function. The CP 213 may perform a distinction and authentication of a terminal in a communication network by using a subscriber identification module (for example, the SIM card 214). Additionally, the CP 213 may provide services, for example, a voice call, a video call, a text message, or packet data, to a user.

Additionally, the CP 213 may control the data transmission of the communication module 230. As shown in FIG. 2, components such as the CP 213, the power management module 295, or the memory 220 are separated from the AP 211, but according to an embodiment of the present disclosure, the AP 211 may be implemented including some of the above-mentioned components (for example, the CP 213).

According to an embodiment of the present disclosure, the AP 211 or the CP 213 may load commands or data, which are received from a nonvolatile memory or at least one of other components connected thereto, into a volatile memory and may process them. Furthermore, the AP 211 or the CP 213 may store data received from or generated by at least one of other components in a nonvolatile memory.

The SIM card 214 may be a card implementing a subscriber identification module and may be inserted into a slot formed at a specific position of an electronic device. The SIM card 214 may include unique identification information (for example, an Integrated Circuit Card IDentifier (ICCID)) or subscriber information (for example, an International Mobile Subscriber Identity (IMSI)).

The memory 220 may include an internal memory 222 or an external memory 224. The memory 220 may be the memory 130 shown in FIG. 1, for example. The internal memory 222 may include at least one of a volatile memory (for example, Dynamic Random Access Memory (DRAM), Static RAM (SRAM), Synchronous Dynamic RAM (SDRAM)) and a non-volatile memory (for example, One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, and NOR flash memory). According to an embodiment of the present disclosure, the internal memory 222 may have a form of Solid State Drive (SSD). The external memory 224 may further include Compact Flash (CF), Secure Digital (SD), Micro Secure Digital (Micro-SD), Mini Secure Digital (Mini-SD), eXtreme Digital (xD), or memorystick.

The communication module 230 may include a wireless communication module 231 or a Radio Frequency® F module 234. The communication module 230 may be the communication unit 160 shown in FIG. 1, for example. The wireless communication module 231 may include a WiFi 233, BT 235, a GPS 237, or a NFC 239. For example, the wireless communication module 231 may provide a wireless communication function by using a wireless frequency. Additionally or alternatively, the wireless communication module 231 may include a network interface (for example, a LAN card) or a modem for connecting the hardware 200 to a network (for example, Internet, LAN, Wire Area Network (WAN), telecommunication network, cellular network, satellite network, or POTS). The communication module 230 may transmit at least one content to the first electronic device when it is determined that a set condition is satisfied. Additionally, the communication module 210 may transmit at least one content, not yet transmitted to the first electronic device, to the first electronic device when it is determined that a battery is being charged.

The RF module 234 may be responsible for data transmission, for example, the transmission of an RF signal or a called electrical signal. Although not shown in the drawings, the RF module 234 may include a transceiver, a Power Amp Module (PAM), a frequency filter, or a Low Noise Amplifier (LNA). The RF module 234 may further include components for transmitting/receiving electromagnetic waves on free space in a wireless communication.

The sensor module 240 may include at least one of a gesture sensor 240A, a gyro sensor 240B, a pressure sensor 240C, a magnetic sensor 240D, an acceleration sensor 240E, a grip sensor 240F, a proximity sensor 240G, a Red, Green, Blue (RGB) sensor 240H, a bio sensor 240I, a temperature/humidity sensor 240J, an illumination sensor 240K, and a Ultra Violet (UV) sensor 240M. The sensor module 240 measures physical quantities or detects an operating state of an electronic device, thereby converting the measured or detected information into electrical signals. Additionally/alternatively, the sensor module 240 may include an E-nose sensor (not shown), an ElectroMyoGraphy (EMG) sensor (not shown), an ElectroEncephaloGram (EEG) sensor (not shown), or an ElectroCardioGram (ECG) sensor (not shown). The sensor module 240 may further include a control circuit for controlling at least one sensor therein.

The user input unit 250 may include a touch panel 252, a (digital) pen sensor 254, a key 256, or an ultrasonic input device 258. The user input unit 250 may be the user input unit 140 shown in FIG. 1, for example. The touch panel 252 may recognize a touch input through at least one of a capacitive, resistive, infrared, or ultrasonic method, for example. Additionally, the touch panel 252 may further include a controller (not shown). In the case of the capacitive method, both direct touch and proximity recognition are possible. The touch panel 252 may further include a tactile layer. In this case, the touch panel 252 may provide a tactile response to a user.

The (digital) pen sensor 254 may be implemented through a method similar or identical to that of receiving a user's touch input or an additional sheet for recognition. As the key 256, a keypad or a touch key may be used, for example. The ultrasonic input device 258, as a device confirming data by detecting sound waves through a microphone (for example, the microphone 288) in a terminal, may provide wireless recognition through a pen generating ultrasonic signals. According to an embodiment of the present disclosure, the hardware 200 may receive a user input from an external device (for example, a network, a computer, or a server) connected to the hardware 200 through the communication module 230.

The display module 260 may include a panel 262 or a hologram 264. The display module 260 may be the display module 150 shown in FIG. 1, for example. The panel 262 may include a Liquid-Crystal Display (LCD) or an Active-Matrix Organic Light-Emitting Diode (AMOLED). The panel 262 may be implemented to be flexible, transparent, or wearable, for example. The panel 262 and the touch panel 252 may be configured with one module. The hologram 264 may show three-dimensional images in the air by using the interference of light. According to an embodiment of the present disclosure, the display module 260 may further include a control circuit for controlling the panel 262 or the hologram 264. The display module 260 may select at least one content to be transmitted to the first electronic device from a plurality of contents.

The interface 270 may include a High-Definition Multimedia Interface (HDMI) 272, a Universal Serial Bus (USB) 274, a projector 276, or a D-subminiature (D-sub) 278. Additionally or alternatively, the interface 270 may include a Secure Digital (SD)/Multi-Media Card (MMC) (not shown) or an InfraRed Data Association (IrDA) (not shown).

The audio CODEC 280 may convert voice and electrical signals in both input and output directions. The audio CODEC 280 may convert voice information inputted or outputted through a speaker 282, a receiver 284, an earphone 286, or a microphone 288.

The camera unit 291, as a device for capturing an image and video, may include at least one image sensor (for example, a front lens or a rear lens), an Image Signal Processor (ISP) (not shown), or a flash LED (not shown).

The power management module 295 may manage the power of the hardware 200. Although not shown in the drawings, the power management module 295 may include a Power Management Integrated Circuit (PMIC), a charger IC, or a battery gauge (not shown).

The PMIC may be built in an IC or SoC semiconductor, for example. A charging method may be classified as a wired method and a wireless method. The charger IC may charge a battery and may prevent overvoltage or overcurrent flow from a charger. According to an embodiment of the present disclosure, the charger IC may include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added.

The battery gauge may measure a remaining charge of the battery 296, or a voltage, current, or temperature thereof during charging. The battery 296 may generate electricity and supply power. For example, the battery 296 may be a rechargeable battery.

The indicator 297 may display a specific state of the hardware 200 or a part thereof (for example, the AP 211), for example, a booting state, a message state, or a charging state. The motor 298 may convert electrical signals into mechanical vibration. The MCU 299 may control the sensor module 240.

Although not shown in the drawings, the hardware 200 may include a processing device (for example, a GPU) for mobile TV support. A processing device for mobile TV support may process media data according to the standards such as Digital Multimedia Broadcasting (DMB), Digital Video Broadcasting (DVB), or media flow.

The names of the above-mentioned components in hardware according to an embodiment of the present disclosure may vary according to types of an electronic device. Hardware according to an embodiment of the present disclosure may be configured including at least one of the above-mentioned components or additional other components. Additionally, some of components in hardware according to an embodiment of the present disclosure are configured as one entity, so that functions of previous corresponding components are performed identically.

Figure 3:
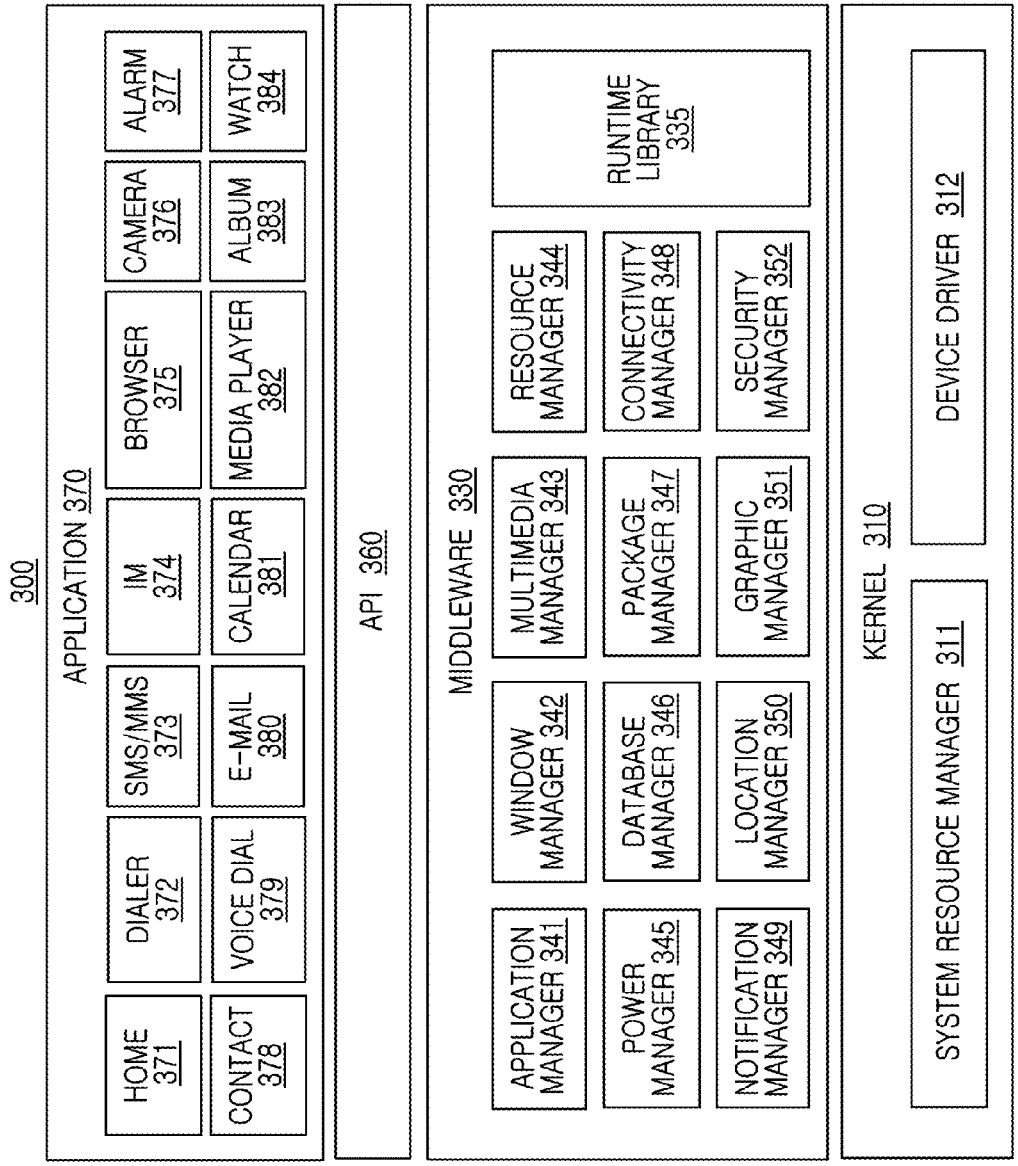
FIG. 3 is a block diagram of a programming module according to an embodiment of the present disclosure.

FIG. 3 is a block diagram of a programming module according to an embodiment of the present disclosure. The programming unit 300 may be included (for example, stored) in the electronic device 100 (for example, the memory 130) of FIG. 1. At least part of the programming module 300 may be configured with software, firmware, hardware, or a combination thereof. The programming module 300 may include an Operating System (OS) controlling a resource relating to an electronic device (for example, the electronic device 100) implemented in hardware (for example, the hardware 200) or various applications (for example, the application 370) running on the OS. For example, the OS may include ANDROID, iOS, WINDOWS, SYMBIAN, TIZEN, or BADA.

Referring to FIG. 3, the programming module 300 may include a kernel 310, a middleware 330, an Application Programming Interface (API) 360, or an application 370.

The kernel 310 (for example, the kernel 131) may include a system resource manager 311 or a device driver 312. The system resource manager 311 may include (not shown) a process management unit 313, a memory management unit 315, or a file system management unit 317, for example. The system resource manager 311 may perform control, allocation, or recovery of a system resource. The device driver 312 may include (not shown) a display driver 314, a camera driver 316, a BT driver 318, a sharing memory driver 320, a USB driver 322, a keypad driver 324, a keypad driver 324, a WiFi driver 326, or an audio driver 328. Additionally, according to an embodiment of the present disclosure, the device driver 312 may include an Inter-Processing Communication (IPC) driver (not shown).

The middleware 330 may include a plurality of pre-implemented modules for providing functions that the application 370 commonly requires. Additionally, the middleware 330 may provide functions through the API 360 to allow the application 370 to efficiently use a limited system resource in an electronic device. For example, as shown in FIG. 3, the middleware 330 (for example, the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module in which a compiler is used to add a new function through programming language while the application 370 is executed. According to an embodiment of the present disclosure, the runtime library 335 may perform functions relating to an input/output, memory management, or calculation operation.

The application manager 341 may manage a life cycle of at least one application among the applications 370. The window manager 342 may manage a GUI resource using a screen. The multimedia manager 343 may recognize a format necessary for playing various media files and may perform encoding or decoding on a media file by using a CODEC appropriate for a corresponding format. The resource manager 344 may manage a resource such as source code, memory, or storage space of at least one application among the applications 370.

The power manager 345 manages a battery or power in operation with a Basic Input/Output System (BIOS) and provides power information necessary for an operation. The database manager 346 may perform a management operation to generate, search, or change a database used for at least one application among the applications 370. The package manager 347 may manage the installation or update of an application distributed in a package file format.

The connectivity manager 348 may manage a wireless connection such as WiFi or BT. The notification manager 349 may display or notify events such as arrival messages, appointments, and proximity alerts in a manner that is not disruptive to a user. The location manager 350 may manage location information of an electronic device. The graphic manager 351 may manage a graphic effect to be provided to a user or a user interface relating thereto. The security manager 352 may provide a general security function necessary for system security or user authentication. According to an embodiment of the present disclosure, when an electronic device (for example, the electronic device 100) has a call function, the middleware 330 may further include a telephony manager (not shown) for managing a voice or video call function of the electronic device.

The middleware 330 may generate and use a new middleware module through various function combinations of the above-mentioned internal component modules. The middleware 330 may provide modules specified according to types of OS so as to provide distinctive functions. Additionally, the middleware 330 may delete some of existing components or add new components dynamically. Accordingly, some components listed in an embodiment of the present disclosure may be omitted, other components are added, or components having different names and performing similar functions may be substituted.

The API 360 (for example, the API 133) may be provided as a set of API programming functions with a different configuration according OS. For example, in the case of ANDROID or iOS, for example, one API set may be provided by each platform, and in the case of TIZEN, for example, more than two API sets may be provided.

The application 370 (for example, the application 134), for example, may include a preloaded application or a third party application. The application 370 may include one or more of a Home function 371, a dialer 372, a Short Message Service (SMS)/Multimedia Message Service (MMS) 373, an Instant Message service 374, a browser 375, a camera application 376, an alarm 377, a contacts application 378, a voice dial function 379, an email application 380, a calendar 381, a media player 382, an album 383, and a watch 384.

At least part of the programming module 300 may be implemented using a command stored in computer-readable storage media. When an instruction is executed by at least one processor (for example, the processor 210), the at least one processor may perform a function corresponding to the instruction. The computer-readable storage media may include the memory 260, for example. At least part of the programming module 300 may be implemented (for example, executed) by the processor 210, for example. At least part of the programming module 300 may include a module, a program, a routine, sets of instructions, or a process to perform at least one function, for example.

The names of components of a programming module (for example, the programming unit 300) according to an embodiment of the present disclosure may vary according to types of OS. Additionally, a programming module may include at least one of the above-mentioned components or additional other components. Or, part of the programming module may be omitted.

Figure 4:
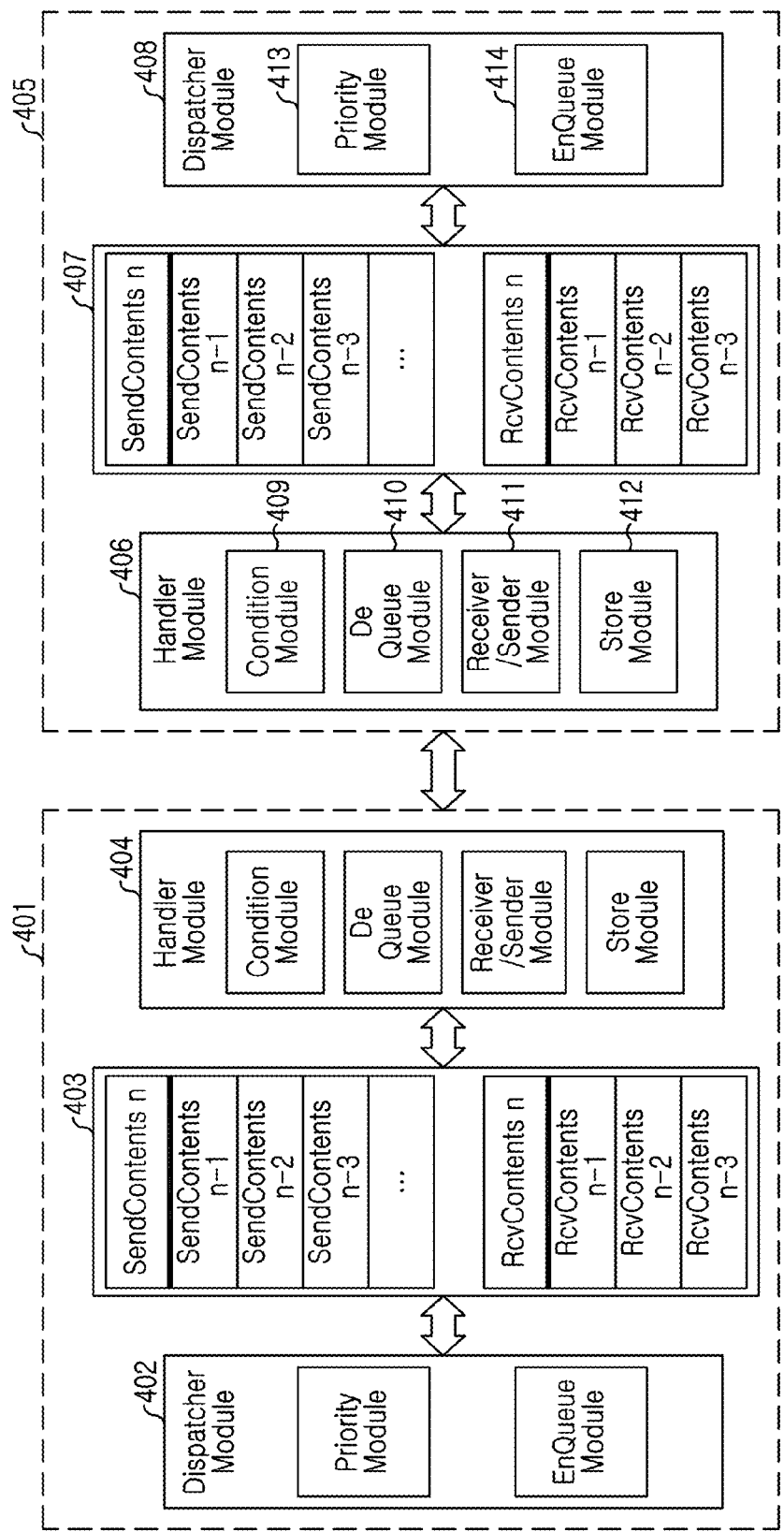
FIG. 4 is a block diagram illustrating a configuration of a first electronic device and a second electronic device according to an embodiment of the present disclosure.

FIG. 4 is a block diagram illustrating a configuration of a first electronic device and a second electronic device according to an embodiment of the present disclosure.

Referring to FIG. 4, the first electronic device 401 includes a dispatcher module 402, a transmission contents storage module 403, and a handler module 404.

The second electronic device 405 may be a wearable electronic device linked with the first electronic device 401. The second electronic device 405 may include a handler module 406, a transmission contents storage module 407, and a dispatcher module 408. The handler module 406 may include a condition module 409, a DeQueue module 410, a sender/receiver module 411, and a store module 412.

The condition module 409 may detect a state of the second electronic device 405. For example, the condition module 409 may detect whether a camera module (not shown) of the second electronic device 405 is terminated, a heating step of the second electronic device 405, and whether the second electronic device 405 is currently being charged. Additionally, the condition module 409 may detect a file resume function while transmitting/receiving contents to/from the first electronic device 401 and whether the second electronic device 405 regenerates a video with only a main frame and transmits it to the first electronic device 401. The DeQueue module 410 may dequeue contents stored in the transmission contents storage module 407. For example, the DeQueue module 410 may dequeue contents stored in the transmission contents storage module 407 according to a circular queue. Additionally, the sender/receiver module 411 may transmit selected contents to the first electronic device 401 and receive contents from the first electronic device 401. Additionally, the store module 412 may store location information on contents stored in the transmission contents storage module 407.

The transmission contents storage module 407 may store a plurality of contents received from the first electronic device 401 and a plurality of contents to be transmitted to the first electronic device 401. Here, the transmission contents storage module 407 may separate contents to be transmitted from received contents and store them or may integrate contents to be transmitted with received contents and store them. According to the embodiment of FIG. 4, the transmission contents storage module 407 separates contents to be transmitted from received contents and stores them.

The dispatcher module 408 performs a role for controlling the transmission contents storage module 407 overall. The dispatcher module 408 includes a priority module 413 and an EnQueue module 414. Here, the priority module 413 may control a transmission order of contents to be transmitted to the first electronic device 401 according to a priority (for example, a priority inputted by a user) set by controlling the transmission contents storage module 407. Additionally, the EnQueue module 414 may newly enqueue contents in the transmission contents storage module 407. For example, the EnQueue module 414 may newly enqueue contents in the transmission contents storage module 407 according to a circular queue.

Figure 5A:
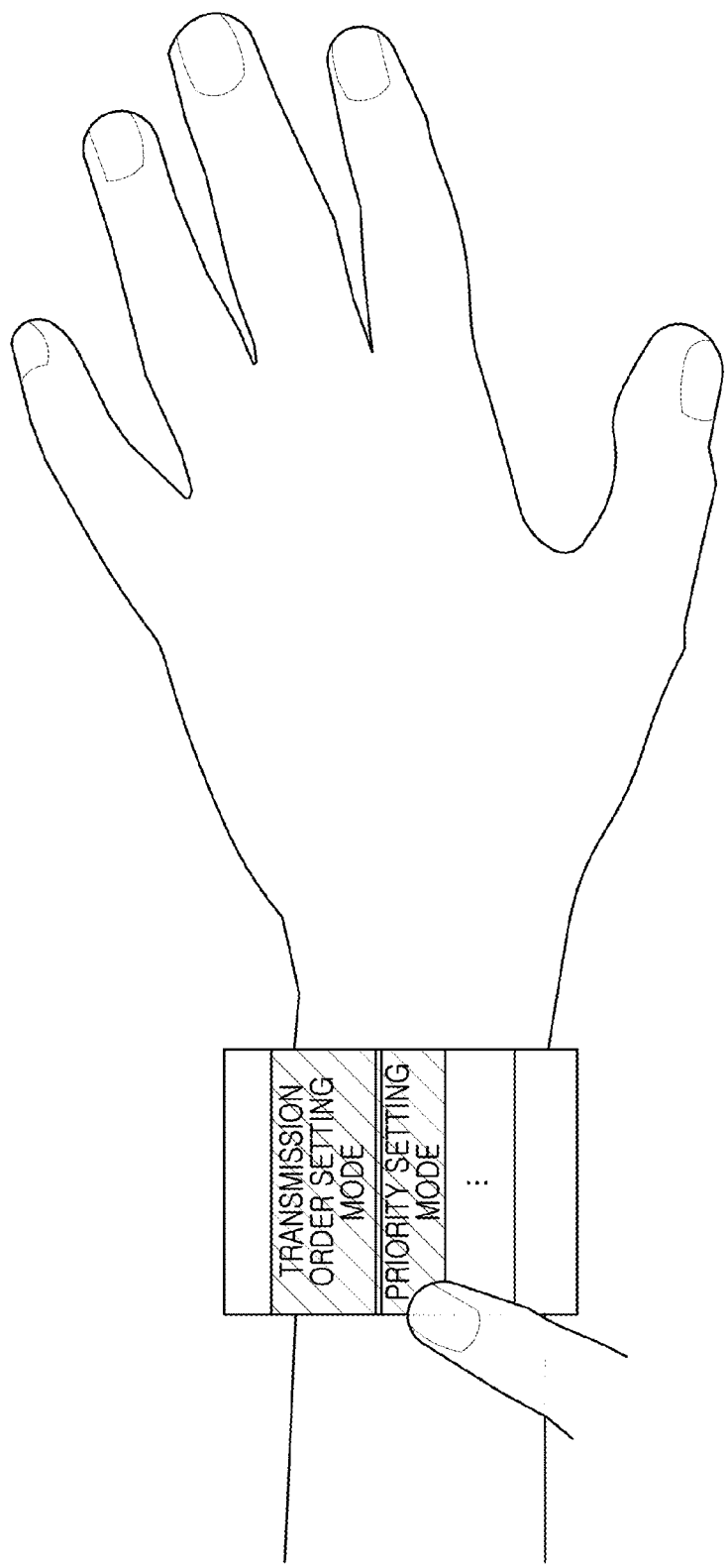
FIGS. 5A, 5B, and 5C are views when contents are transmitted from a second electronic device into a first electronic device according to an embodiment of the present disclosure.
Figure 5B:
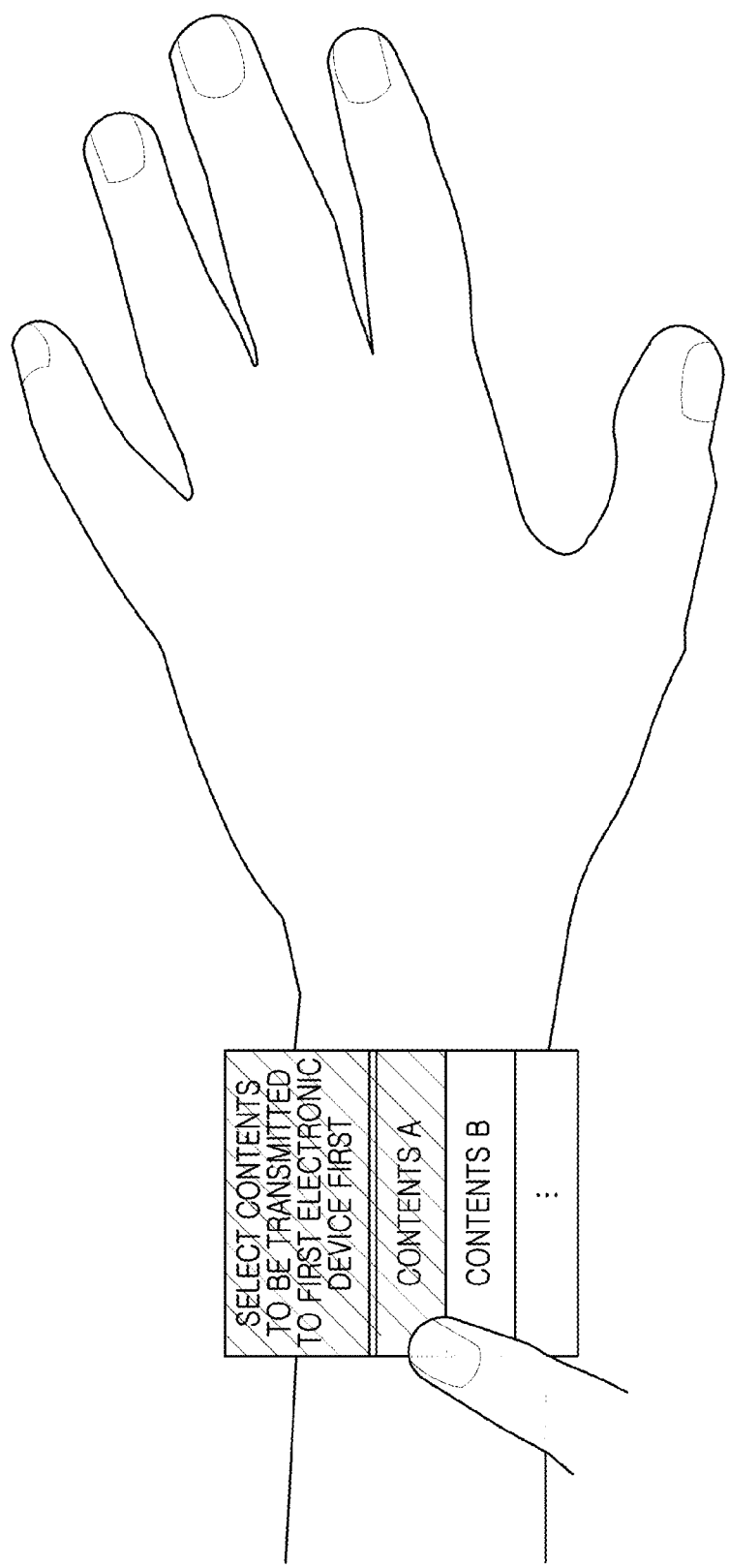
Figure 5C:
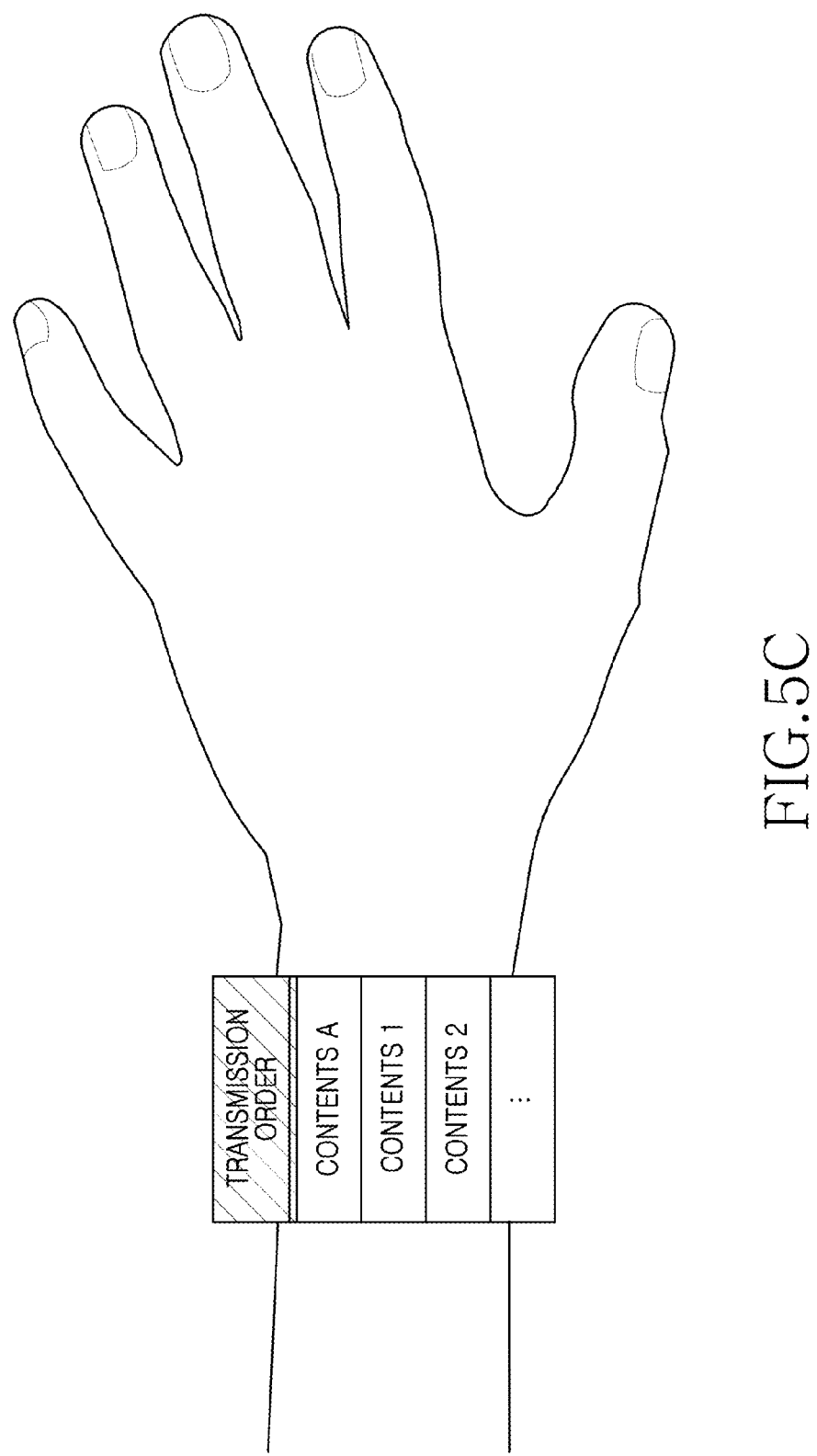

FIGS. 5A, 5B and 5C are a view of when contents are transmitted from a second electronic device into a first electronic device according to a set priority. Hereinafter, the first electronic device and the second electronic device are separately described for convenience, but they may be mutually the same. That is, the first electronic device may be the kind as the second electronic device and vice versa. First, when selected contents among contents stored in the second electronic device are transmitted from the second electronic device into the first electronic device, the second electronic device may determine whether set conditions (for example, arbitrary conditions set by a user) are satisfied.

When it is determined that set conditions for transmitting contents pre-selected by a user from the second electronic device to the first electronic device are satisfied, the second electronic device may determine whether a priority for transmission is set before transmitting the selected contents to the first electronic device. For example, in the second electronic device, contents to be transmitted prior to other contents may be set or contents for allowing an emergency message recorded voice file to be transmitted prior to other contents may be set. Hereinafter, a method of setting a priority by selecting contents to be transmitted first from the second electronic device to the first electronic device is described.

The second electronic device switches into a "transmission order setting mode" by a user's selection and displays a plurality of set transmission order modes on a touch screen to receive one selection. For example, as shown in FIG. 5A, the second electronic device may select a "priority setting mode" from the plurality of transmission order modes displayed on the touch screen in the transmission order setting mode.

The second electronic device may select at least one content to be transmitted first to the first electronic device. For example, as shown in FIG. 5B, the second electronic device may select "contents A" from contents displayed on the touch screen of the second electronic device with a guide message, for example, "select contents to be transmitted first to the first electronic device".

The second electronic device may display a transmission order to be transmitted to the first electronic device on the display module of the second electronic device. For example, as shown in FIG. 5C, the second electronic device may display contents on the display module thereof according to a priority, for example, contents A, contents 1, and contents 2. That is, the second electronic device may display on the display module that contents A are transmitted to the first electronic device prior to contents 1 and contents 2.

The second electronic device may determine whether there is at least one content not transmitted to the first electronic device among a plurality of contents. According to the above embodiment of the present disclosure, the second electronic device displays contents according to a priority, such as contents A, contents 1, and contents 2, and then determines whether there is a content among them not yet transmitted to the first electronic device.

If there is at least one content not yet transmitted to the first electronic device, the second electronic device may determine whether a battery is being charged under set conditions.

If it is determined that the battery is being changed, the second electronic device may transmit at least one content not yet transmitted to the first electronic device to the first electronic device according to a set priority.

FIGS. 6A, 6B, 6C, 6D, 6E, and 6F are a view illustrating a set condition for reducing current consumption in a second electronic device according to an embodiment of the present disclosure. First, the second electronic device may select at least one content to be transmitted to the first electronic device from a plurality of contents stored in the second electronic device. Here, the second electronic device may be a wearable electronic device and may be linked with the first electronic device to transmit/receive mutual contents through a short range communication such as WiFi, BT, and NFC. Additionally, the second electronic device may be connected to the first electronic device through a wired or wireless way.

The second electronic device may determine whether at least one selected content satisfies a set condition to be transmitted to the first electronic device. For example, when transmitting the selected contents to the first electronic device, the second electronic device may determine whether to transmit contents on the basis of excessive current consumption and/or heat of the second electronic device. For example, when the second electronic device is a wearable electronic device, since it contacts the user's body directly, excessive current consumption may induce the heat and thus provide discomfort and risk factors to a user. In order to prevent this, it may be determined whether a set transmission condition is satisfied.

Figure 6A:
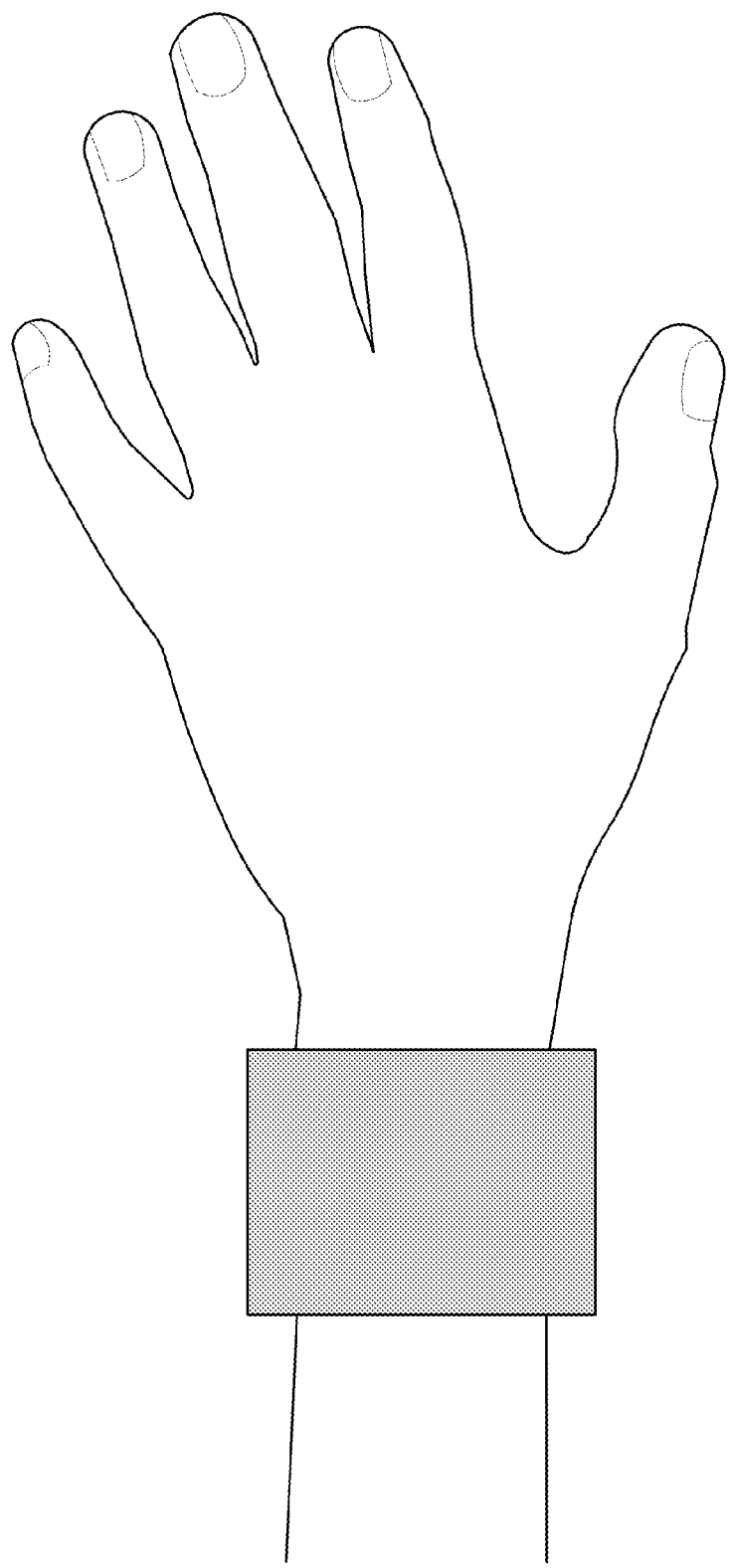
FIGS. 6A, 6B, 6C, 6D, 6E and 6F are views illustrating a set condition for reducing current consumption in a second electronic device according to an embodiment of the present disclosure.

According to various embodiments of the present disclosure, a transmission condition set in the second electronic device may be the condition that a module for capturing an image or a video is not in operation. For example, as shown in FIG. 6A, after capturing an image, as a camera module (including voice recording) in operation is terminated, the second electronic device may determine that a set condition for transmitting selected contents to the first electronic device is satisfied. For example, while a module for capturing an image or a video is in operation, as captured contents are to be transmitted from the second electronic device to the first electronic device, since the second electronic device is in an excessive heat state, it may determine that the set transmission condition is not satisfied.

The second electronic device may terminate the camera module by receiving a terminate instruction of a user and if an instruction for capturing is not received within a set time, may terminate the camera module without a user's terminate instruction. The second electronic device may vary a time for determining whether to terminate a camera module without a user's terminate instruction according to a user's use history. For example, when receiving an input ten times from a user within a predetermined time, the second electronic device may terminate the camera module if an input is not received for 30 sec after receiving the last input. For another example, when receiving an input five times from a user within a predetermined time, the second electronic device may terminate the camera module if an input is not received for 15 sec after receiving the last input. For another example, when receiving an input fewer than two times from a user within a predetermined time, the second electronic device may terminate the camera module if an input is not received for 5 sec after receiving the last input.

Figure 6B:
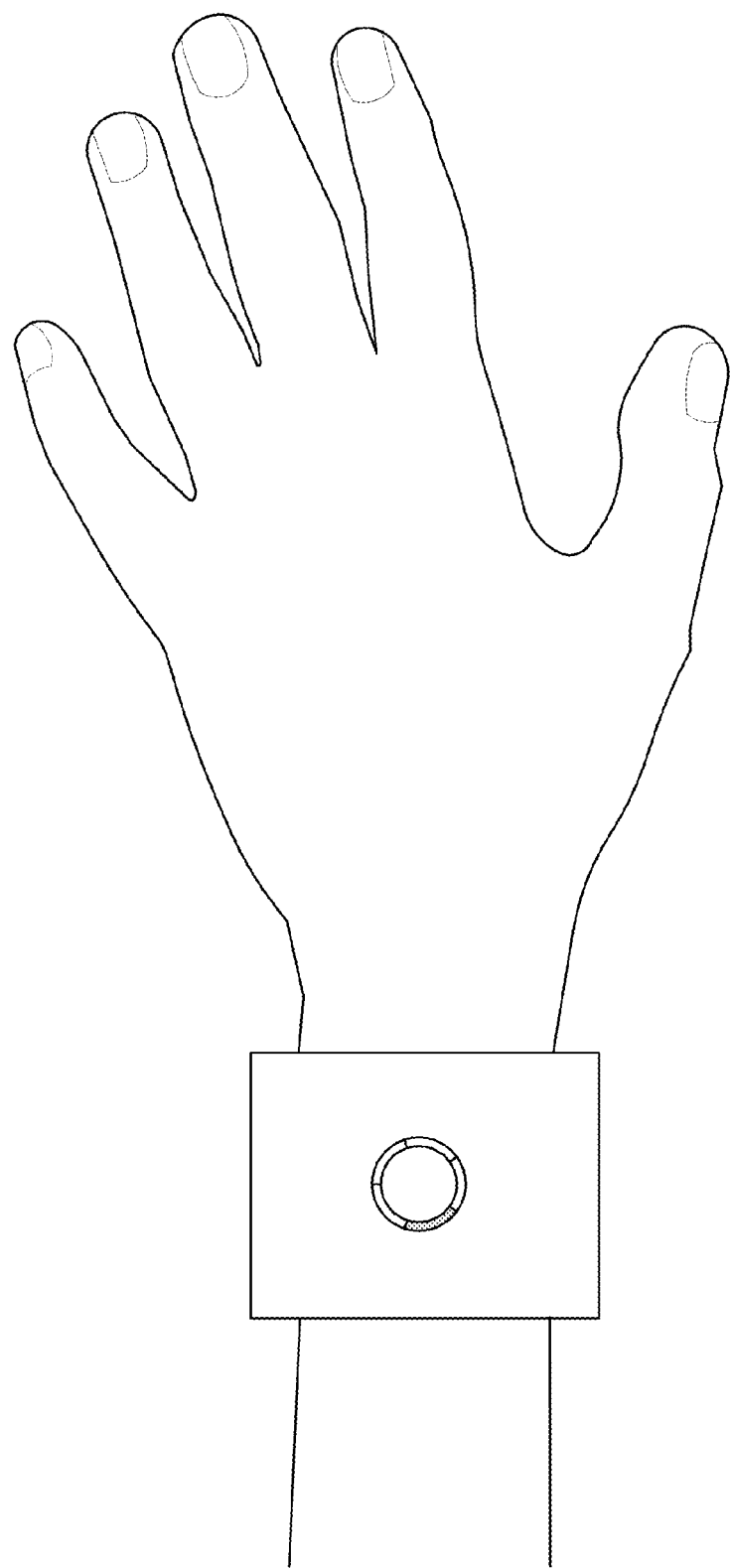

According to various embodiments of the present disclosure, a transmission condition set in the second electronic device may be the condition that a current heat step is less than a set heat step. For example, as shown in FIG. 6B, when selected contents are transmitted from the second electronic device to the first electronic device, the second electronic device may detect a current heat step. When it is determined that the current heat step is less than the set heat step, the second electronic device may transmit selected contents to the first electronic device. When it is determined that the current heat step is more than the set heat step, the second electronic device may not transmit selected contents to the first electronic device in order to avoid becoming too hot.

Figure 6C:
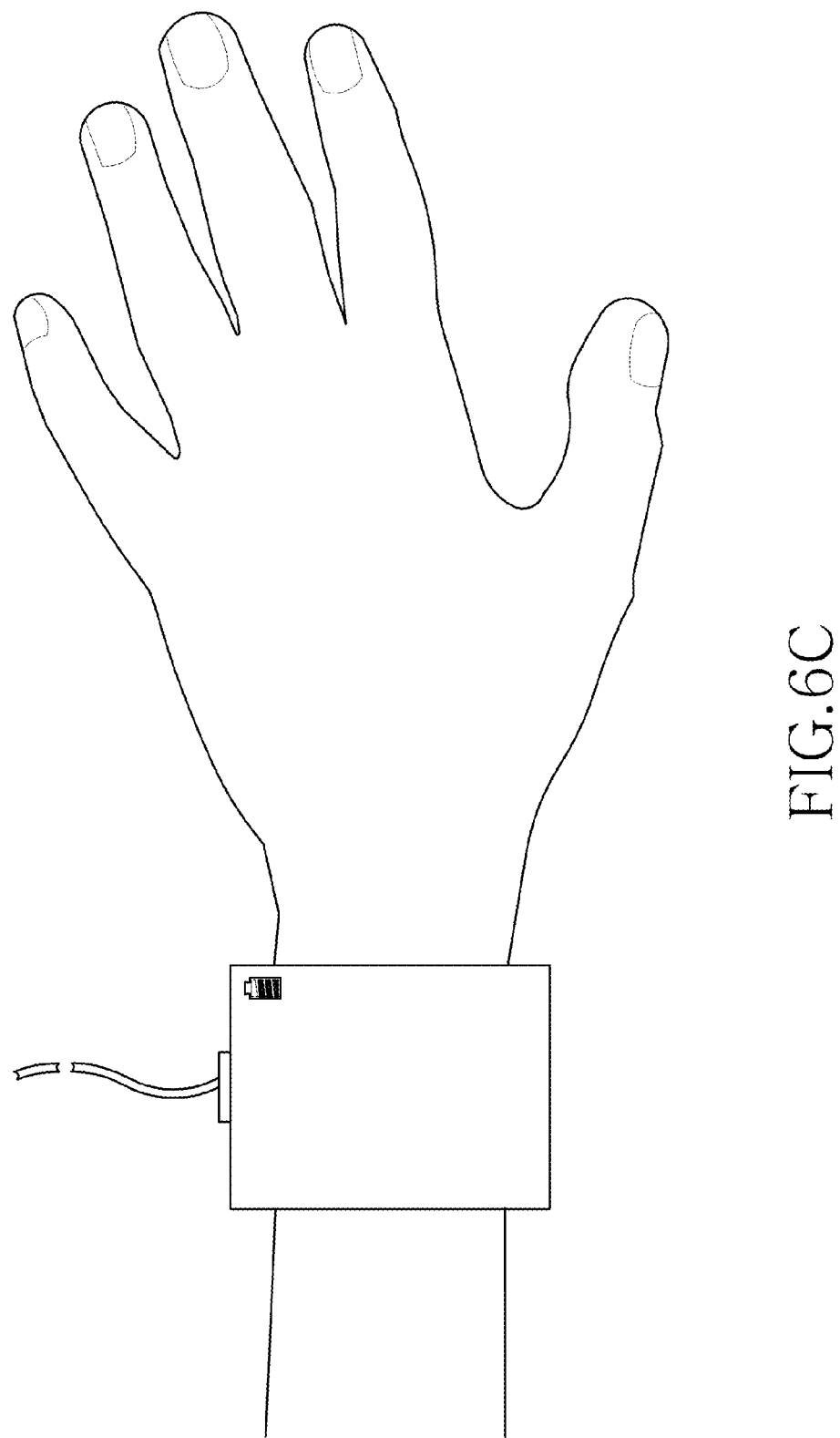

According to various embodiments of the present disclosure, a transmission condition set in the second electronic device may be the condition that a battery is being charged. For example, as shown in FIG. 6C, when selected contents are transmitted from the second electronic device to the first electronic device, if a battery is being charged, the second electronic device determines that the set condition is satisfied. For example, when a battery is being charged currently, the second electronic device may transmit selected contents to the first electronic device.

Figure 6D:
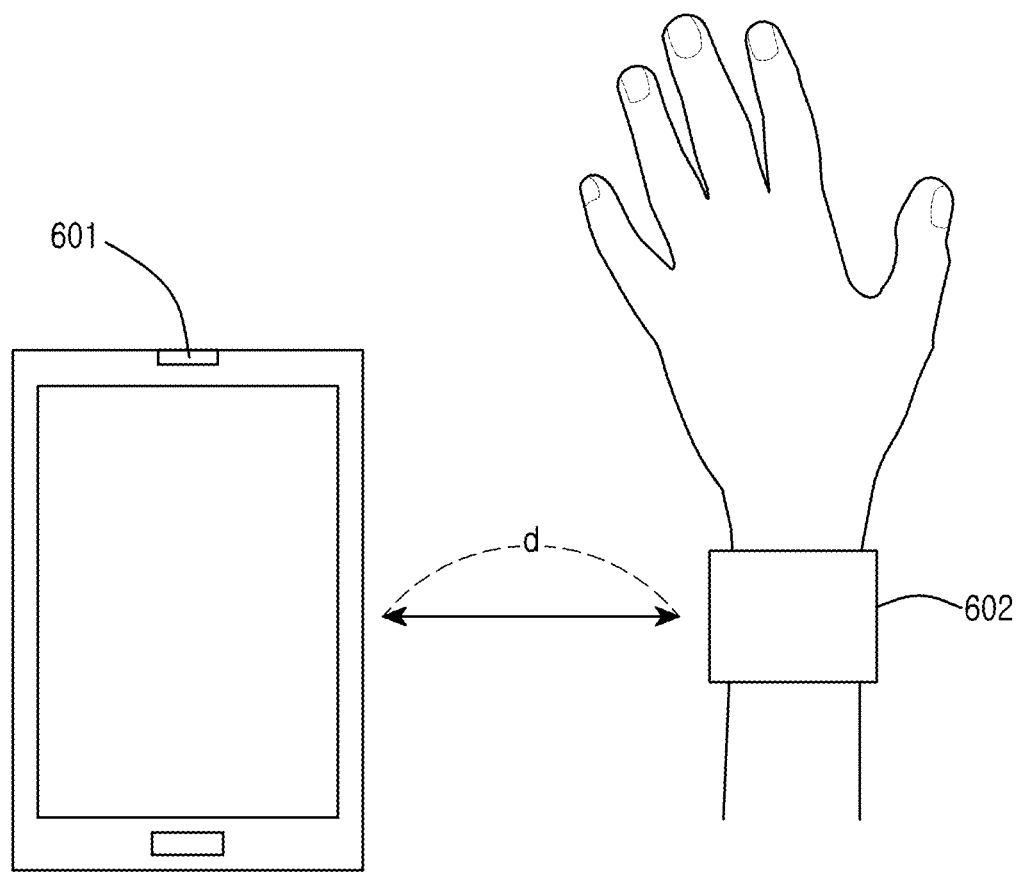

According to various embodiments of the present disclosure, a transmission condition set in the second electronic device may be the condition that a distance with the first electronic device is less than a set distance. For example, as shown in FIG. 6D, a second electronic device 602 may determine the distance from a first electronic device 601 by scanning a packet transmitted from the first electronic device 601 and analyzing the reception intensity of the packet. Then, when a distance from the first electronic device 601 is less than a set distance d, the second electronic device 602 may transmit selected contents to the first electronic device 601.

Figure 6E:
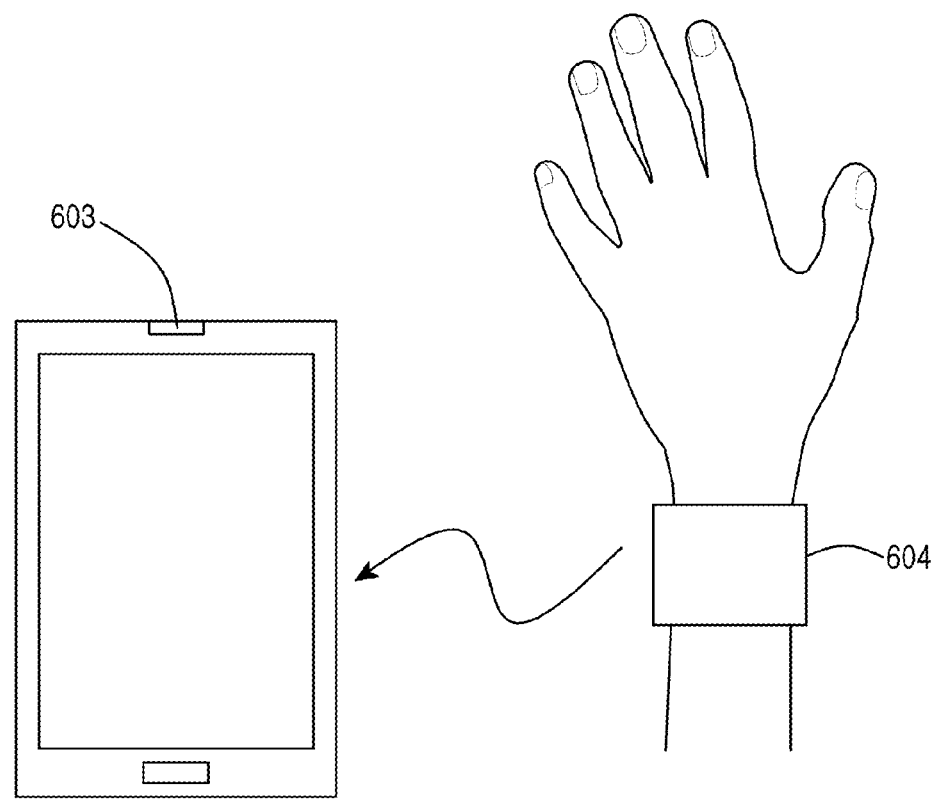

According to various embodiments of the present disclosure, a transmission condition set in the second electronic device may be the condition that at least one selected content is divided into at least two frames and transmitted to the first electronic device. For example, the condition is that when it is possible to divide content into more than two frames and transmit them, the second electronic device transmits the content. For example, as shown in FIG. 6E, if transmission is lost while selected contents are transmitted from the second electronic device 604 to the first electronic device 603, the contents being transmitted may be continuously received.

Figure 6F:
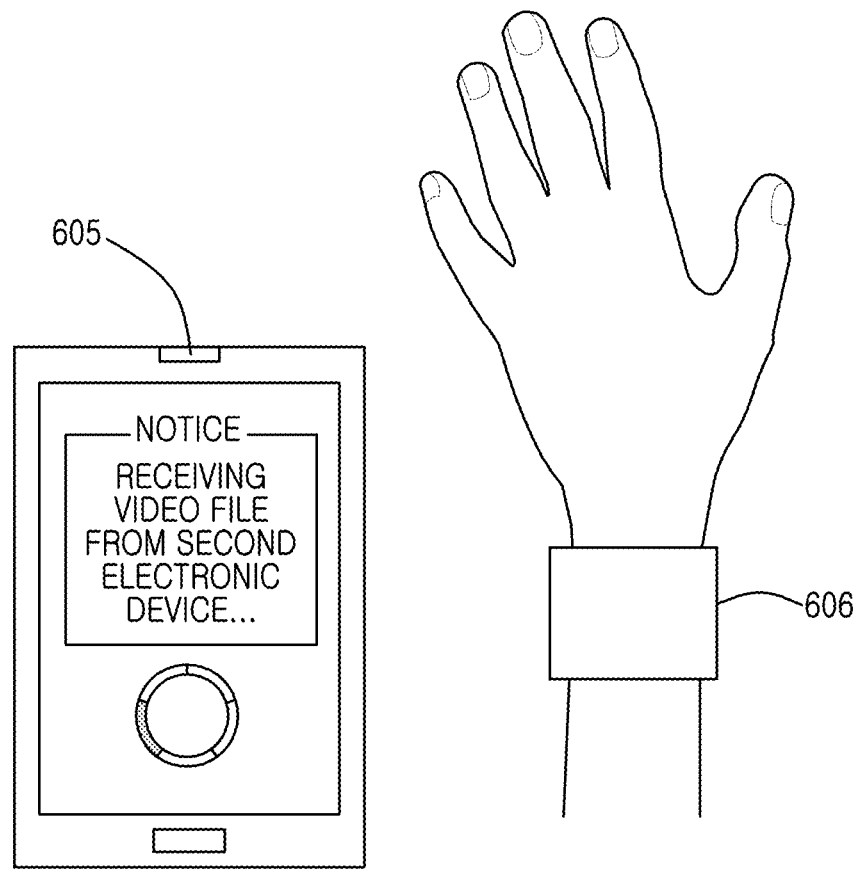

According to various embodiments of the present disclosure, a transmission condition set in the second electronic device may be the condition that only a set frame in at least one selected content is transmitted to the first electronic device. For example, as shown in FIG. 6F, the case that a stored video is transmitted from the second electronic device 606 to the first electronic device 605 is described. In the above example, when a loud voice is detected or there is a change of a reference screen frame by analyzing a video to be transmitted to the first electronic device 605, the second electronic device 606 may regenerate a video with a main frame and then may transmit the regenerated video to the first electronic device 605. For example, under the condition for transmitting only a main frame (for example, the condition for transmitting only a main frame when selected contents are transmitted to the first electronic device), the second electronic device 606 may transmit the selected contents to the first electronic device 605.

Figure 7:
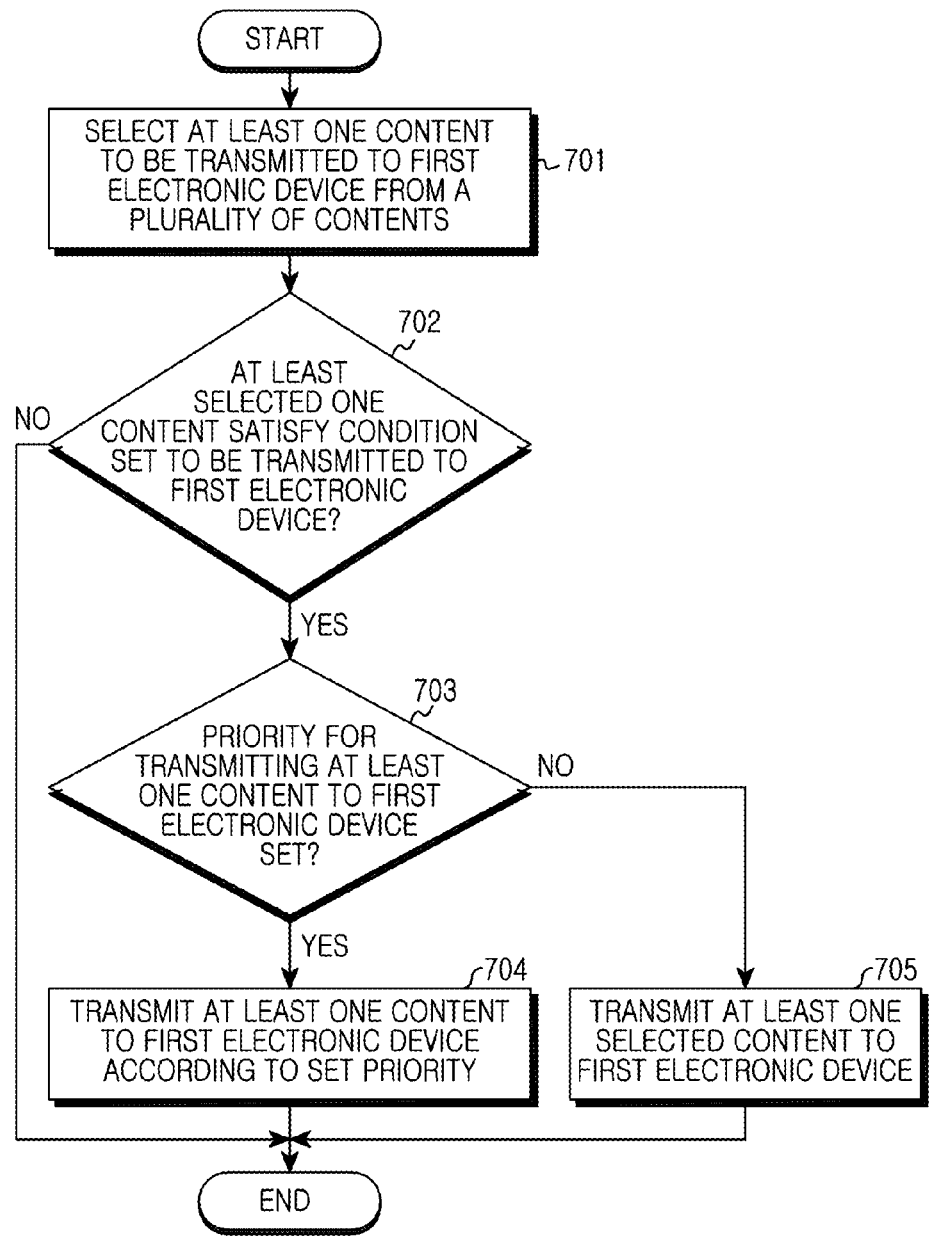
FIG. 7 is a flowchart illustrating an operation order of a second electronic device according to an embodiment of the present disclosure.

FIG. 7 is a flowchart illustrating an operation order of a second electronic device according to an embodiment of the present disclosure.

Referring to FIG. 7, the second electronic device may receive at least one content to be transmitted to the first electronic device among a plurality of contents in operation 701. The first electronic device and the second electronic device may be mutually linked to each other to transmit/receive contents.

The second electronic device may determine whether at least one selected content satisfies a set condition to be transmitted to the first electronic device in operation 702. The set condition may include a condition that a capturing module for capturing an image or a video is not in operation, a condition that a current heat step is less than a set heat step, a condition that a battery is being charged, a condition that a distance from the first electronic device is less than a set distance, a condition that at least one content is divided into more than two frames and transmitted to the first electronic device, and a condition that only a set frame among at least one content is transmitted to the first electronic device. The second electronic device may set a content to be transmitted first prior to other contents. For example, the second electronic device may set a content for allowing an emergency message recorded voice file to be transmitted prior to other contents.

When it is determined in operation 702 that the set condition that at least one selected content is transmitted to the first electronic device is satisfied, the second electronic device may determine whether a priority for transmitting the at least one content to the first electronic device is set in operation 703. In this embodiment, although the second electronic device determines first whether the set transmission condition is satisfied, it may determine first whether a priority for transmitting contents to the first electronic device is set.

When it is determined in operation 703 that the priority for transmitting at least one content to the first electronic device is set, the second electronic device may transmit at least one content to the first electronic device according to the set priority in operation 704. That is, when attempting to transmit selected contents, the second electronic device may transmit at least one content to the first electronic device according to a set priority other than an existing transmission order.

When it is determined in operation 703 that the priority for transmitting at least one content to the first electronic device is not set, the second electronic device may transmit at least one content to the first electronic device according to the existing transmission order in operation 705.

Figure 8:
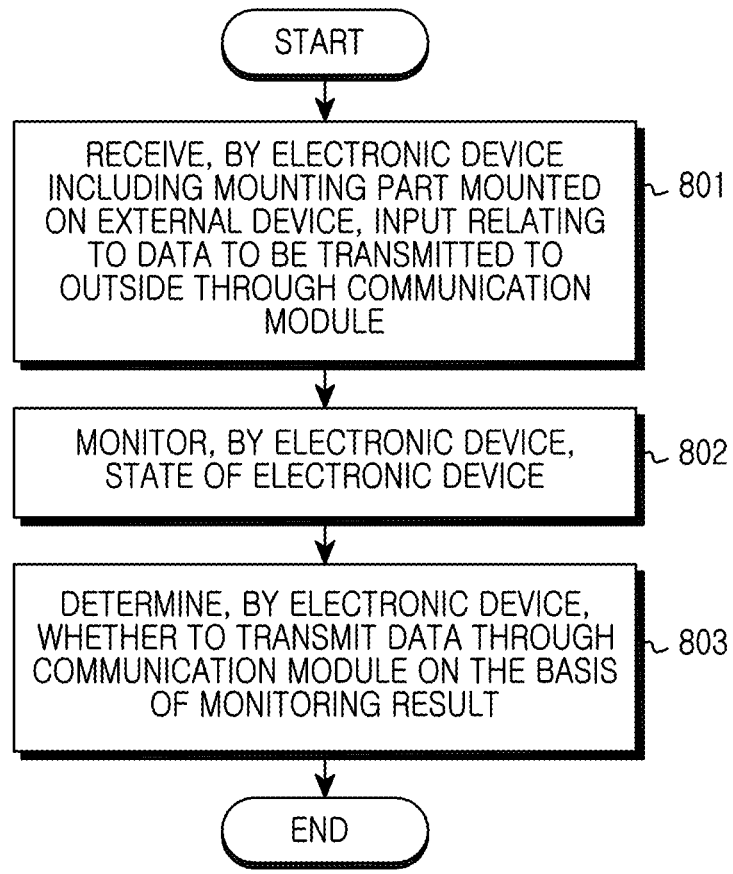
FIG. 8 is a flowchart illustrating a method of an electronic device according to an embodiment of the present disclosure.

FIG. 8 is a flowchart illustrating a method of an electronic device according to an embodiment of the present disclosure.

Referring to FIG. 8, the electronic device including a mounting part mounted on a foreign object may receive an input relating to data to be transmitted to the outside through a communication module in operation 801. For example, the electronic device may select data to be transmitted to another electronic device and may select a transmission order according to a user's selection. Or, the electronic device may receive data to be transmitted to the communication unit automatically on the basis of a data generated time.

The electronic device may monitor a state thereof in operation 802. For example, the electronic device may monitor a capturing module for capturing an image or a video, an internal temperature of the electronic device, a distance from another electronic device, and a state in which at least part of at least one data is transmitted to another electronic device. The electronic device may determine in operation 803 whether to transmit the data through the communication unit on the basis of a monitoring result. For example, when a set transmission condition is satisfied, the electronic device may transmit data to another electronic device. For example, the electronic device may transmit data through the communication unit when at least one of a condition that a capturing module is terminated, a condition that a current heat step is less than a set heat step, a condition that a battery is being charged, a condition that a distance with the first electronic device is less than a set distance, a condition that at least one content is divided into more than two frames and transmitted to the first electronic device, and a condition that only a set frame among at least one content is transmitted to the first electronic device is satisfied.

Figure 9:
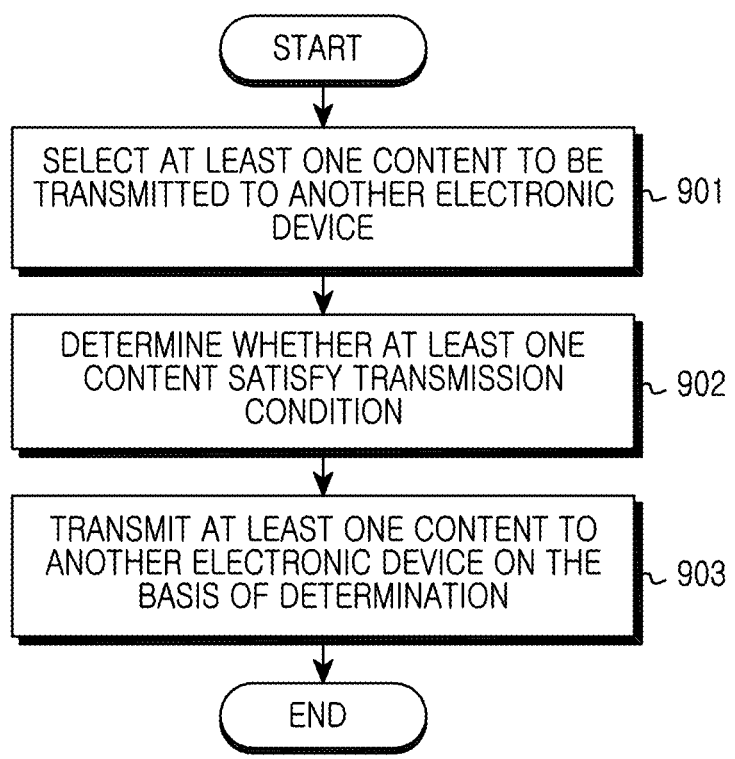
FIG. 9 is a flowchart illustrating a method of an electronic device according to an embodiment of the present disclosure.

FIG. 9 is a flowchart illustrating a method of an electronic device according to an embodiment of the present disclosure.

Referring to FIG. 9, the electronic device may receive a selection of at least one content to be transmitted to another electronic device in operation 901. For example, the electronic device may receive at least one content selection by a user to be transmitted to another electronic device from a plurality of contents stored in the electronic device. Or, at least one content to be transmitted to another electronic device may be selected automatically on the basis of a generated time of content stored in the electronic device.

The electronic device may determine whether at least one content satisfies a transmission condition in operation 902. The set condition may include a condition that a capturing module for capturing an image or a video is not in operation, a condition that a current heat step is less than a set heat step, a condition that a battery is being charged, a condition that a distance from another electronic device is less than a set distance, a condition that at least one content is divided into more than two frames and transmitted to another electronic device, and a condition that only a set frame among at least one content is transmitted to another electronic device.

The electronic device may transmit at least one content to the other electronic device on the basis of a determination in operation 903. For example, when it is determined that the priority for transmitting at least one content to another electronic device is set, the electronic device may transmit at least one content to the other electronic device according to the set priority. Additionally, when it is determined that the priority for transmitting at least one content to another electronic device is not set, the electronic device may transmit at least one content to the other electronic device regardless of the set priority.

While the present disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A data transmission method in an electronic device, the method comprising:
   receiving an input relating to data to be transmitted;
   monitoring a state of the electronic device;
   comparing the state of the electronic device to a pre-set transmission condition for preventing an excessive current consumption of the electronic device when transmitting the data;
   determining whether the state of the electronic device satisfies the pre-set transmission condition;
   transmitting the data when the state of the electronic device satisfies the pre-set transmission condition; and
   refraining from transmitting the data when the state of the electronic device does not satisfy the pre-set transmission condition,
   wherein the pre-set transmission condition comprises a camera module of the electronic device terminating,
   wherein the transmitting of the data comprises:
      determining a transceiver among a plurality of transceivers based on at least part of the monitoring result, and
      transmitting at least part of the data through the determined transceiver, and
   wherein the transceiver is selected on a basis of consuming less power than another transceiver.

2. The method of claim 1, wherein the monitoring of the state of the electronic device comprises monitoring whether the camera module of the electronic device is currently operating.

3. The method of claim 1, wherein the receiving of the input comprises receiving the input through a user interface in the electronic device.

4. The method of claim 1, wherein the monitoring of the state of the electronic device comprises monitoring whether at least one function of the electronic device is currently operating.

5. The method of claim 1, wherein the monitoring of the state of the electronic device comprises monitoring a measurement value obtained from at least one component of the electronic device.

6. The method of claim 5, wherein the at least one component of the electronic device comprises at least one of the camera module, a power management module, a sensor module, or a transceiver.

7. The method of claim 1, wherein the refraining from transmitting the data comprises delaying transmission of the data through a transceiver for a predetermined time based on at least part of the monitoring result.

8. The method of claim 1, wherein the transmitting of the data comprises transmitting only part of the data through a transceiver based on at least part of the result of the monitoring.

9. The method of claim 8, wherein the transmitting of the only part of the data comprises:
   determining whether a priority for the data to be transmitted to an external device is set; and transmitting the data to the external device according to the priority when it is determined that the priority is set.

10. The method of claim 9, wherein the priority for the data to be transmitted is determined according to a user input.

11. The method of claim 9, wherein an emergency data has a higher priority than other data.

12. The method of claim 1, further comprising:
transmitting the data through a transceiver; and
deleting the data from the electronic device after the transmitting of the data.

13. The method of claim 1,
wherein the electronic device comprises at least one data obtaining device at a mounting part, and
wherein the method further comprises obtaining the data from the data obtaining device.

14. The method of claim 13,
wherein the electronic device is connected to a portion of the mounting part and further comprises a main body spaced from the data obtaining device, and
wherein the method further comprises transmitting data obtained from the data obtaining device to the main body.

15. The method of claim 1, wherein the electronic device comprises at least one of an electronic wrist watch, an electronic eyewear, an electronic ankle bracelet, an electronic bracelet, or an electronic ring.

16. An electronic device comprising:
a mounting part mounted on an external object;
at least one transceiver; and
a processor operatively coupled to the at least one transceiver, the processor configured to perform operations comprising:
receiving an input relating to data to be transmitted through the transceiver;
monitoring a state of the electronic device;
comparing the state of the electronic device to a pre-set transmission condition for preventing an excessive current consumption of the electronic device when transmitting the data;
determining whether the state of the electronic device satisfies the pre-set transmission condition;
transmitting the data through the transceiver when the state of the electronic device satisfies the pre-set transmission condition; and
refraining from transmitting the data when the state of the electronic device does not satisfy the pre-set transmission condition,
wherein the pre-set transmission condition comprises a camera module of the electronic device terminating,
wherein, to transmit the data, the processor is configured to:
determine a transceiver among a plurality of transceivers based on at least part of the monitoring result, and
transmit at least part of the data through the determined transceiver, and wherein the transceiver is selected on a basis of consuming less power than another transceiver.

17. The electronic device of claim 16, wherein the processor is further configured to monitor whether the camera module of the electronic device is currently operating.

18. The electronic device of claim 16, wherein the processor is further configured to monitor whether at least one function of the electronic device is currently operating.

19. The electronic device of claim 16,
wherein the processor is further configured to determine whether a priority for the data to be transmitted to an external device is set, and
wherein the transceiver is configured to transmit the data to the external device according to the priority when it is determined that the priority is set.

20. A non-transitory computer readable recording medium having a program recorded thereon, which, when executed by an electronic device, implements a method comprising:
receiving an input relating to data to be transmitted through a transceiver;
monitoring a state of the electronic device;
comparing the state of the electronic device to a pre-set transmission condition for preventing an excessive current consumption of the electronic device when transmitting the data;
determining whether the state of the electronic device satisfies the pre-set transmission condition;
transmitting the data through the transceiver when the state of the electronic device satisfies the pre-set transmission condition; and
refraining from transmitting the data when the state of the electronic device does not satisfy the pre-set transmission condition,
wherein the pre-set transmission condition comprises a camera module of the electronic device terminating,
wherein the transmitting of the data comprises:
determining a transceiver among a plurality of transceivers based on at least part of the monitoring result, and
transmitting at least part of the data through the determined transceiver, and
wherein the transceiver is selected on a basis of consuming less power than another transceiver.

* * * * *